Jan. 10, 1967 C. R. BARLOW 3,297,260
NOZZLE AND VALVE ASSEMBLY
Filed Sept. 21, 1964 2 Sheets-Sheet 1

INVENTOR:
Conrad R. Barlow

By Smyth, Roston & Pavitt
Attorneys

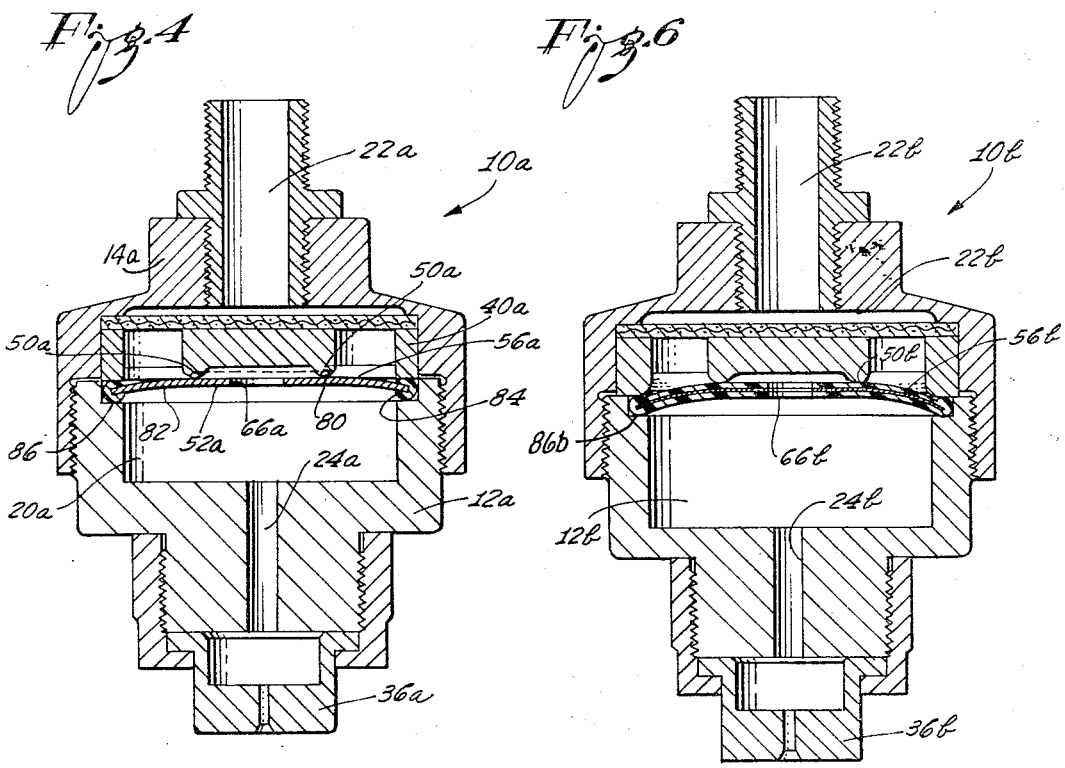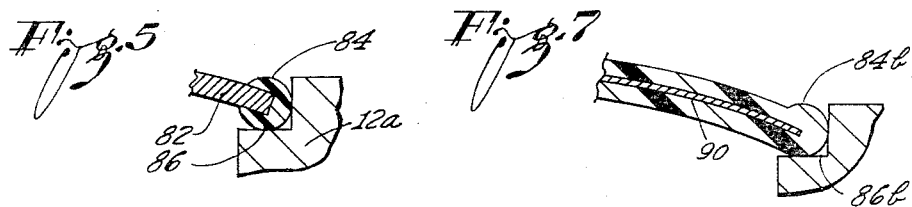

United States Patent Office 3,297,260
Patented Jan. 10, 1967

3,297,260
NOZZLE AND VALVE ASSEMBLY
Conrad R. Barlow, 103 Via Mesa Grande,
Redondo Beach, Calif. 90277
Filed Sept. 21, 1964, Ser. No. 397,772
6 Claims. (Cl. 239—533)

This invention relates to spray nozzle and valve assemblies particularly adapted for performing under varying conditions of use, such as agricultural spraying from an aircraft.

Presently available spray nozzle and valve assemblies of the type to which this invention pertains, comprise a relatively long, complex and expensive structure having an internal tubular member and a spring biased diaphragm which engages one end of the tubular member. When fluid entering the assembly acts upon the diaphragm, it disengages the diaphragm from the tubular member and allows fluid to flow to the nozzle, and when the flow of fluid is interrupted, the diaphragm again engages the tubular member to stop the flow of fluid from the nozzle and to prevent dripping any residue therefrom. Because of the particular arrangement and the impervious nature of the diaphragm, it is necessary to locate the valve inlet laterally of the axis of the elongated tubular member and to provide an enlarged chamber where the diaphragm may act freely. It is also necessary to provide complex strainers which are located within the tubular member and to provide such other items as diaphragm followers which serve to strengthen the diaphragm as it engages the end of the tubular member, all of which contribute to make the assembly expensive to manufacture.

A feature of the present invention resides in the particular arrangement of parts of the nozzle and valve assembly which simplifies the construction, allows use of a simpler strainer and reduces the overall size of the assembly, all of which contributes to a greater reliability and a reduction in size of the assembly and expense of manufacture.

Briefly, the nozzle and valve assembly comprising this invention is a body and cap which define a valve chamber in which a ring is disposed having a centrally located sealing land. A resiliently biased apertured disc is urged against the sealing land in opposition to fluid entering the inlet to the valve chamber. The disc is arranged so as to be subject to the fluid entering the valve chamber to disengage the disc from the sealing land and permit the flow of fluid to flow out through the aperture in the diaphragm to the nozzle. With this arrangement, the inlet and outlet can be coaxial and the entire length of the assembly shortened, with a consequent reduction in weight; this latter being an important factor in aircraft.

In this arrangement, too, the strainer is considerably simplified, and as will be clear from a more detailed description hereinafter, the biasing means for the flexible apertured disc is a helical spring and in other embodiments the flexible apertured disc itself forms the biasing means therefor which still further reduces a number of parts and decreases the weight and cost of nozzle and valve assemblies.

Other and additional features and advantages of the present invention will become apparent to anyone skilled in the art after a study of the specification and drawings forming a part hereof, and wherein:

FIGURE 4 is a cross-sectional elevational view of another embodiment of the nozzle assembly illustrating its valve in closed position;

FIGURE 5 is an enlarged fragmentary sectional view of the sealing disc of the valve of the nozzle assembly of FIGURE 4;

FIGURE 6 is a cross-sectional elevational view of another embodiment of the nozzle assembly illustrating its valve in closed position; and FIGURE 7 is an enlarged fragmentary sectional view of the sealing disc of the valve of the nozzle assembly of FIGURE 6.

Figure 1:
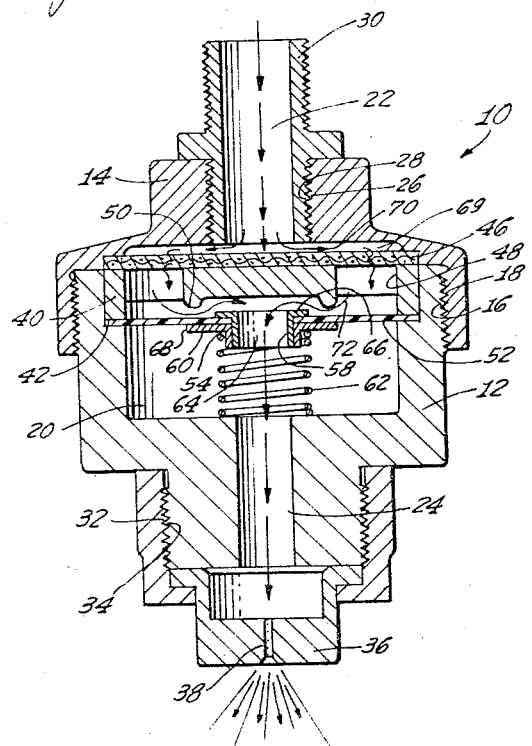
FIGURE 1 is a cross-sectional elevational view illustrating the nozzle assembly with its valve in open position.
Figure 2:
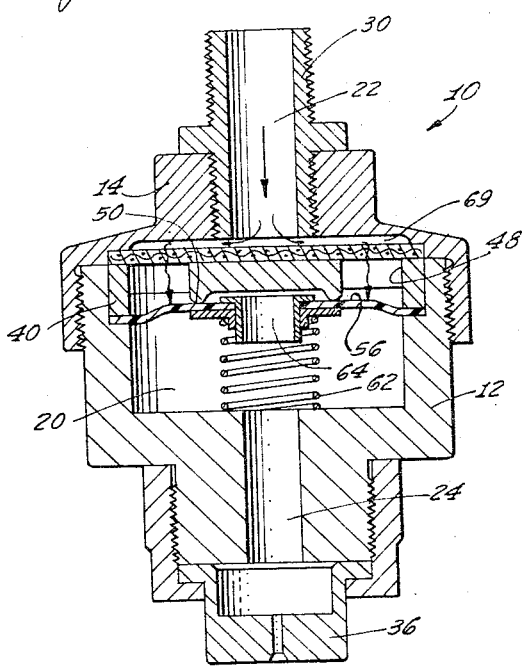
FIGURE 2 is a cross-sectional elevational view illustrating the nozzle assembly with its valve in closed position.
Figure 3:
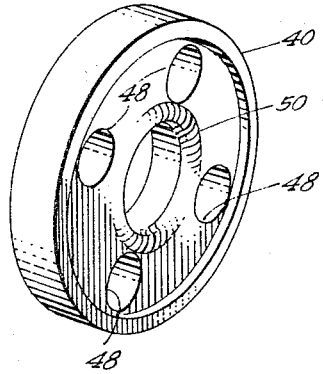
FIGURE 3 is a perspective view of a valve ring forming part of the nozzle assembly.

Turning now to FIGURES 1, 2 and 3, it can be seen that there is illustrated a leak proof nozzle and valve assembly illustrated in its entirety as 10 constructed in accordance with the teachings of this invention. Nozzle assembly 10 has a cup-shaped body 12 and a cap 14 which is internally threaded as at 16 to receive the external threads 18 of the body 12 in fluid type relationship. Body 12 and cap 14 provide a cylindrical valve chamber 20 with an inlet opening 22 provided in the cap 14 and a valve outlet opening 24 defined by an axial passage provided in the body 12. Cap 14 is provided with internal threads 26 to receive the external threads 28 of a coupling 30 which in the embodiment illustrated defines the inlet 22 coaxial with the passage defining outlet 24. Coupling 30 connects the valve chamber 20 with a supply of fluid from a spray system.

The end of the valve body 12 opposite the cap 14 is of reduced diameter and provided with external threads 32 to receive an externally threaded nozzle coupling or cap 34 to clamp nozzle 36 thereto, such nozzle being selected from a number of types of nozzles for providing different spray patterns to suit different agricultural needs. Nozzle opening 38 is in open communication with the outlet 24 so that fluid entering the inlet 22 may flow out the nozzle 36 in spray form.

As hereinbefore mentioned, an important feature of nozzle assemblies is that they avoid objectionable dripping from the nozzle when the supply of fluid thereto is shut off and the means for accomplishing this non-dripping in this invention will now be described in detail.

Between inlet 22 and outlet 24 and in the valve chamber 20, is a valve ring 40, the diameter of which is large enough to span the chamber 20 and seat in shoulder 42 formed by counterboring of the valve body 12. Valve ring 40 is clamped in said shoulder by the threading of the cap 14 onto the valve body together with a strainer 44, also of a diameter to span the valve chamber 20. The valve ring 40 is provided with suitable apertures 48 (four shown) located longitudinally of the wall of the valve chamber 20 to permit fluid to flow from the inlet 22 through the strainer 46 into the chamber 20. The valve ring 40 is also provided with a circular sealing land 50 in the form of a boss with a radiused corner facing or extending toward the outlet 24 and radially inwardly of the apertures 48. The sealing land 50 cooperates with a flexible sealing disc 52 of an outer diameter sufficient to span the valve chamber 20 and be held in place on shoulder 42 together with the valve ring 40 and strainer 44, by the clamping action when the cap 14 is assembled onto the body 12. This flexible sealing disc 52 is provided with a central aperture 54, the diameter of which is less than the diameter of the sealing land 50 so that one wall 56 of the disc, i.e., the one facing the inlet 22 and aperture 44, is engageable with the sealing land when the valve is closed, as shown in FIGURE 2. The radially inner edge of the flexible sealing disc defining the aperture 54 is clamped between a bushing 58 and a collar 60 to provide the disc with rigidity and a base against which a helical spring 62 may act to bias the sealing disc toward sealing engagement with the sealing land 50. In the embodiment disclosed, the bushing 58 is L-shaped in cross section so as to define a cylindrical outlet 64 through which liquid flows toward the outlet 24, it being noted that the land 50 is of such a height to permit the flared end 66 of the bushing to telescope within the lands to permit the wall 56 to flex into a dish-shaped configuration and engage the land 50. The collar 60 is also flared outwardly to define a wall 68 a distance substantially the diameter of the sealing land 50 to support the flexible sealing disc under operation of the spring 62.

From the above description, it can be seen that fluid from a source of supply entering the valve inlet 22 will flow radially outwardly in a passage defined by the ring 40 and the wall 69 of chamber 20 as indicated by arrow 70 through the strainer 44 and then axially of the valve, i.e., through the aperture 48 and impinge upon the wall 56 of the flex sealing disc to unseat the wall from the sealing land 50. The fluid will then flow past the sealing land 50, radially inwardly as illustrated by arrows 72, and thence axially of the valve through the outlet 24 and through the nozzle opening 38. This condition will remain so long as fluid under sufficient pressure is supplied from the supply of fluid to overcome the resilient bias of spring 62. Upon interruption of this supply, the spring 62 will bias the wall 56 into sealing engagement with the sealing land 50 shutting off the flow of fluid immediately without dripping of the residue fluid from the inlet 22 and the piping to the fluid supply.

Turning now to FIGURES 4 and 5, it can be seen that the valve assembly therein disclosed is similar to the valve assembly comprising the embodiment shown in FIGURES 1–3, and like parts having the same function are given the like reference numerals with the suffix "a." In this embodiment, however, sealing land 50a is provided with an O-ring 80 which replaces the radiused corner of sealing land 50 and which provides the contact with the upper wall 56a of the sealing disc 52a. In this embodiment, the sealing disc 52a is thin, flexible, metallic and dish-shaped with its convex surface 56a engaging the sealing ring 80 and with the concave surface 82 facing toward the nozzle 36a. This sealing disc is also provided with a central aperture 66a of a smaller diameter than sealing land 50a so that the surface 56a when engaging the O-ring 80 effectively shuts off the supply of fluid to the outlet 24a and nozzle 36a. The thin metallic sealing disc 56a spans the valve chamber 12a and is biased toward sealing position by its inherent resiliency. Expansion of the disc toward a planar configuration by operation of the fluid under pressure from the source of supply impinging upon surface 56a, is accommodated by a circumferential resilient ring 84 of rubber or rubber-like material loosely disposed on shoulder 86, as illustrated at FIGURE 5. Shoulder 86 is defined in the valve body 12a and is sufficient to permit the sealing disc 56a to act like a Belleville washer. In this embodiment, the lower end of the valve ring 40a engages the end of the valve body 12a, and is held in position by the cap 14a to permit the ring 84 to be loosely disposed on the shoulder 86 as distinguished from clamping of the ring 84 against the shoulder 86 of the valve body, as illustrated in conection with FIGURES 1–3, inclusive. Resilient ring 84 serves to bias and, thus, like spring 62, aid the dish-shaped disc 52a to return to its original and closed valve condition when the flow of fluid in inlet 22a is interrupted.

In the embodiment thus described, the liquid entering the valve inlet 22a will flow in a manner identical with the flow of liquid described in connection with the embodiment illustrated in FIGURES 1–3, but in this embodiment, the sealing disc itself and the circumferential ring 84 function like the flexible sealing ring 52 in combination with the helical spring 62, bushing 58 and collar 60.

Turning now to FIGURES 6 and 7, the nozzle assembly illustrated therein is provided with parts having like function as described in connection with FIGURES 1–5, and are identified as identical reference numerals except for the suffix "b." In this embodiment, however, the ring 40b is substantially identical with the ring 40 in that the land 50a is wholly of metal and is not provided with a sealing ring such as 80 in the embodiment illustrated in FIGURE 4. The sealing disc 52b differs from the sealing disc in the embodiment illustrated in FIGURES 1–3 and the embodiment illustrated in FIGURES 4–5 in that it is thin, flexible, metallic and dish-shaped embedded in a flexible covering of rubber or rubber-like material 90 as illustrated in FIGURE 7. This disc 52b is centrally apertured as at 66b, the diameter of which is less than the diameter of the sealing land 50b so as to shut the flow of fluid to the nozzle 36b in a manner similar to that previously described except that in this embodiment, the surface 56b, being resilient, engages the metallic land 50b like the surface 56 engages the land 50 in the embodiment of FIGURES 1–3. The outer periphery of the disc spanning the valve chamber 12b engages a shoulder 86b, the configuration and location of which is identical with the shoulder 86 of the embodiment shown in FIGURES 4 and 5 and cooperates with an enlarged radius or bead 84b forming an integral part of the covering 90, but cooperating with the shoulder 86b in the same manner as described in connection with the sealing ring 84. It is apparent that fluid under pressure entering the inlet 22b will have a flow pattern identical with that described in connection with FIGURES 1–3 and upon an interruption of the supply of fluid, the inherent resiliency of the sealing disc 52b and the bias of the bead 84b will cause the resilient surface 56b to engage the land 50b and prevent dripping of any liquid from the nozzle 36b.

From the above description, it is apparent that the present invention comprises a nozzle and valve assembly which is simplified in construction, reduced in overall size and will permit the use of more efficient methods of manufacture and materials to reduce the cost of manufacture, yet will perform efficiently and effectively under all conditions of use.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A nozzle and valve assembly for spraying fluid from an aircraft wherein the nozzle and valve assembly is connectible to a source of fluid having an upstream conduit to which the supply of fluid is intermittently shut off, the combination of:

a body having a passageway therethrough defining an inlet connectible to the upstream conduit to receive the fluid therefrom and a valve chamber intermediate said inlet and said outlet;

spray nozzle means at said outlet for spraying the fluid from said body;

a valve ring secured to said body within said valve chamber, said valve ring having aperture means in communication with said inlet and a valve seat facing downstream;

a sealing disc secured to said body within said valve chamber downstream of said valve seat and being engageable with said valve seat when the supply of fluid to the upstream conduit is shut off, said sealing disc having an aperture of less cross-sectional area than said valve seat and lying entirely within the area of said valve seat when said sealing disc engages said valve seat to define a barrier for the fluid flowing through said aperture means, said aperture means extending downstream through said valve ring and terminating at a point lying radially outwardly of said aperture in said sealing disc; and resilient means for biasing said sealing disc upstream and into engagement with said valve seat to maintain said sealing disc in sealing engagement with said valve seat when the supply of fluid to the upstream conduit is shut off to prevent the fluid in the upstream conduit from dripping through said passageway out through said spray nozzle means, said sealing disc being engageable by the fluid flowing through said aperture means of said valve ring to move said sealing disc downstream and out of engagement with said valve seat so that the fluid may flow through said aperture of said sealing disc to said spray nozzle means when fluid is supplied to the upstream conduit.

2. A combination as defined in claim 1 in which said valve seat includes an annular rib protruding downstream toward said sealing disc and held in engagement therewith by said resilient means when the supply of the fluid to the upstream conduit is shut off, one of said rib and said sealing disc having a resilient portion engageable with the other of said rib and said sealing disc to provide a substantially fluid-tight seal.

3. A combination as defined in claim 1 wherein said sealing disc and said valve ring each have a peripheral portion, said valve chamber has a circumferentially extending groove defining a shoulder, said peripheral portion of said sealing disc resting on said shoulder and being firmly clamped thereagainst by said peripheral portion of said valve ring, said resilient means including a spring downstream of said sealing disc for maintaining said sealing disc for maintaining said sealing disc in sealing engagement with said valve seat when the supply of the fluid to the upstream conduit is shut off.

4. A combination as defined in claim 3 including a filter element having a peripheral portion disposed in said circumferentially extending groove upstream from said valve ring.

5. A combination as defined in claim 1 in which said sealing disc includes a resilient diaphragm and is biased into engagement with said valve seat by the inherent resilience of said diaphragm.

6. A combination as defined in claim 5 wherein said valve chamber has a circumferentially extending shoulder therein and said sealing disc also includes resilient means around the periphery of said diaphragm, said resilient means being secured to said diaphragm and being loosely disposed on said circumferentially extending shoulder.

References Cited by the Examiner
UNITED STATES PATENTS

| | | | |
|---|---|---|---|
| 213,118 | 3/1879 | Locke | 137—496 |
| 2,006,319 | 6/1935 | Hueber | 137—496 |
| 2,524,951 | 10/1950 | Ashton. | |
| 2,615,675 | 10/1952 | Wellert | 137—498 |
| 3,108,610 | 10/1963 | De See | 137—550 X |
| 3,112,768 | 12/1963 | Thompson | 137—625.5 |
| 3,164,164 | 1/1965 | Pall et al. | 137—525 X |
| 3,176,712 | 4/1965 | Ramsden | 137—496 |

M. CARY NELSON, *Primary Examiner.*

MARTIN P. SCHWADRON, *Examiner.*

R. J. MILLER, *Assistant Examiner.*